(12) United States Patent
Graf

(10) Patent No.: US 8,607,556 B2
(45) Date of Patent: Dec. 17, 2013

(54) DAMPER ASSEMBLY WITH COULOMB DAMPENING AND RIVET ACCESS

(75) Inventor: Mark Graf, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 678 days.

(21) Appl. No.: 12/902,791

(22) Filed: Oct. 12, 2010

(65) Prior Publication Data

US 2011/0088380 A1 Apr. 21, 2011

Related U.S. Application Data

(60) Provisional application No. 61/252,818, filed on Oct. 19, 2009.

(51) Int. Cl.
*F16D 33/00* (2006.01)
(52) U.S. Cl.
USPC ......... 60/338; 29/889.2; 29/524.1; 29/525.06
(58) Field of Classification Search
USPC ............ 60/338, 435; 29/889.2, 524.1, 525.06
See application file for complete search history.

(56) References Cited

U.S. PATENT DOCUMENTS

| 6,926,131 | B1 | 8/2005 | Arhab et al. | |
| 7,530,223 | B2 * | 5/2009 | Ender et al. | 60/338 |
| 8,161,739 | B2 * | 4/2012 | Degler et al. | 60/338 |

* cited by examiner

*Primary Examiner* — Edward Look
*Assistant Examiner* — Logan Kraft
(74) *Attorney, Agent, or Firm* — Simpson & Simpson, PLLC

(57) ABSTRACT

A torque converter, including: a turbine shell; a turbine hub fixedly connected to the turbine shell; and a damper assembly. The damper assembly includes: a damper hub; first and second cover plates fixedly connected to one another and engaged with a first plurality of springs, the second plate fixedly connected to the turbine hub; third and fourth cover plates fixedly connected to one another and engaged with the plurality of first springs and with a second plurality of springs disposed radially inward of the first plurality of springs; a third spring for displacing the third cover plate in a first axial direction such that the first and third cover plates are in contact and the turbine and damper hubs are in contact.

20 Claims, 6 Drawing Sheets

DAMPER ASSEMBLY WITH COULOMB DAMPENING AND RIVET ACCESS

CROSS-REFERENCE TO RELATED APPLICATIONS

This application claims the benefit under 35 U.S.C. §119 (e) of U.S. Provisional Application No. 61/252,818, filed Oct. 19, 2009.

FIELD OF THE INVENTION

The invention relates to a damper assembly for a torque converter, in particular, a damper assembly providing frictional engagement between a cover plate and a flange for the damper assembly.

BACKGROUND OF THE INVENTION

The prior art teaches a lack of frictional engagement between an outer cover plate of a damper assembly for a torque converter and a flange for the damper assembly.

BRIEF SUMMARY OF THE INVENTION

The present invention broadly comprises a torque converter, including: a turbine shell; a turbine hub fixedly connected to the turbine shell; and a damper assembly. The damper assembly includes: a damper hub; first and second cover plates fixedly connected to one another and engaged with a first plurality of springs, the second plate fixedly connected to the turbine hub; third and fourth cover plates fixedly connected to one another and engaged with the plurality of first springs and with a second plurality of springs disposed radially inward of the first plurality of springs; a third spring for displacing the third cover plate in a first axial direction such that the first and third cover plates are in contact and the turbine and damper hubs are in contact.

The present invention also broadly comprises a torque converter, including: a turbine shell; a turbine hub; and a damper assembly. The damper assembly includes: a damper hub; first and second cover plates fixedly connected to one another and engaged with a first plurality of springs; third and fourth cover plates fixedly connected to one another and engaged with the first plurality of springs and with a second plurality of springs disposed radially inward of the first plurality of springs; a flange engaged with the second plurality of springs; a thrust washer with a plurality of openings; a plurality of fastening devices connecting the damper hub and the flange; and a third spring for urging the thrust washer against the flange in a first axial direction such that the plurality of openings is radially aligned with respective portions of the plurality of fastening devices.

The present invention further broadly comprises a torque converter, including: a turbine shell; a turbine hub; a first plurality of fastening devices fixedly connecting the turbine shell to the turbine hub; and a damper assembly. The damper assembly includes: a damper hub; first and second cover plates fixedly connected to one another and engaged with a first plurality of springs, the second plate fixedly connected to the turbine hub by the first plurality of fastening devices; third and fourth cover plates fixedly connected to one another and engaged with the first plurality of springs and with a second plurality of springs disposed radially inward of the first plurality of springs; and a third spring with a first plurality of openings. The first plurality of openings is axially aligned with the first plurality of fastening devices.

The present invention also broadly comprises a method for assembling a torque converter, including: stacking a turbine hub, a turbine shell, and a first plate for a damper assembly; inserting a plurality of rivets through respective openings in the turbine hub, the turbine shell, and the first plate; stacking remaining parts for the damper assembly including: second, third, and fourth plates; a flange; a thrust washer; and a diaphragm spring, such that the diaphragm spring urges the thrust washer against the flange; inserting a tool respective openings in the first and second cover plates, the diaphragm spring, the thrust washer, and the flange to access the plurality of rivets; and coining the plurality of rivets using the tool.

It is a general object of the present invention to provide a damper assembly to provide frictional dampening for the assembly while providing access to fastening devices.

These and other objects and advantages of the present invention will be readily appreciable from the following description of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It is to be understood that any methods, devices or materials similar or equivalent to those described herein can be used in the practice or testing of the invention.

Figure 1A:
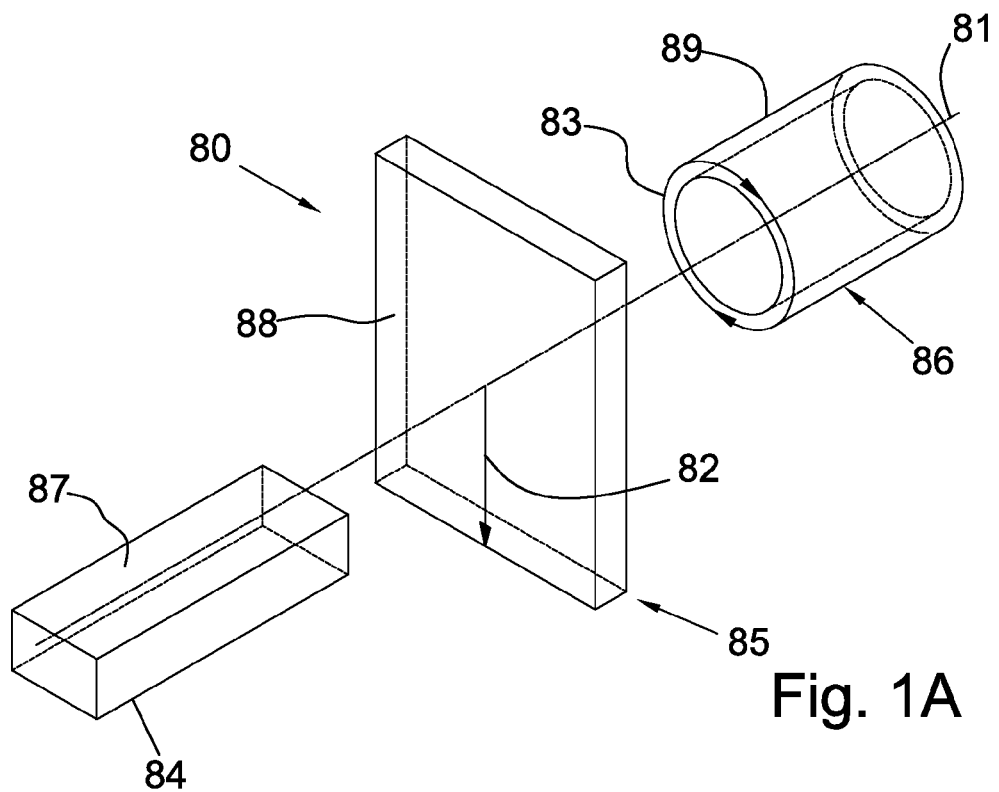
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
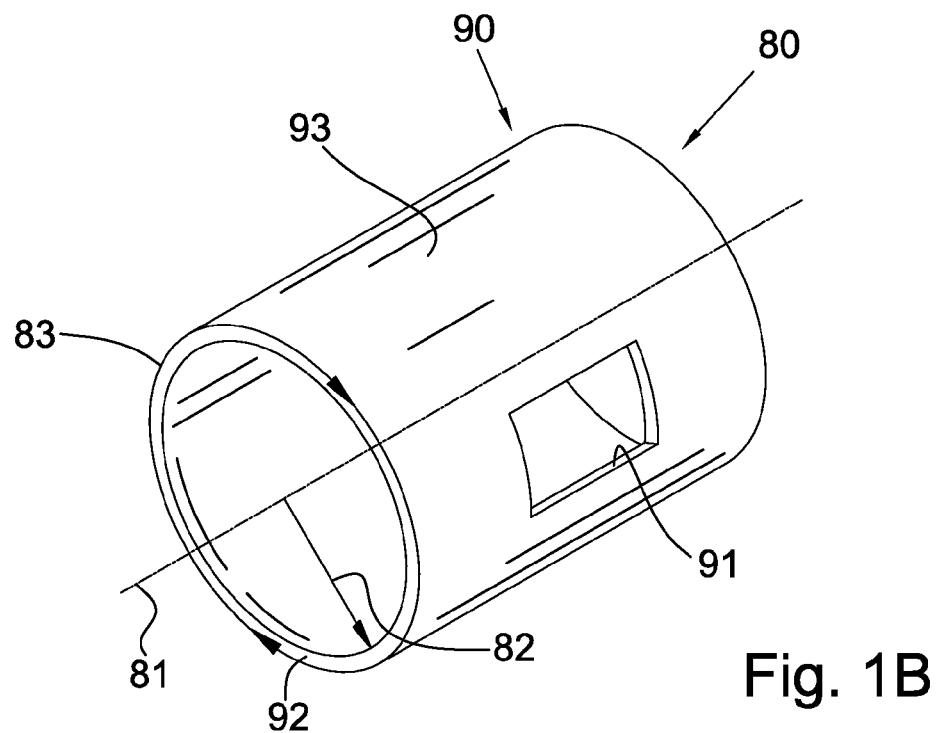
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
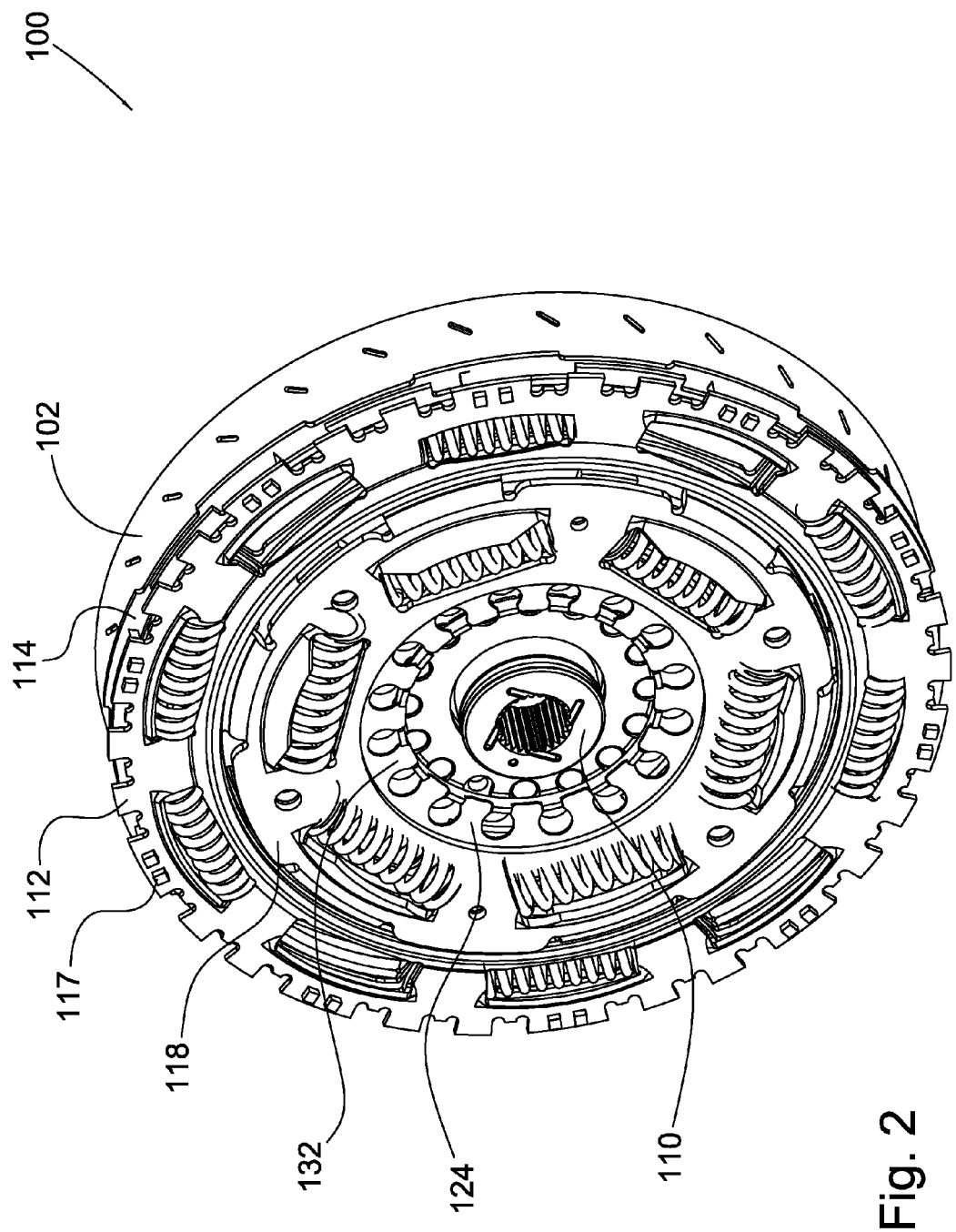
FIG. 2 is a front perspective view of a portion of a present invention torque converter.

FIG. 2 is a front perspective view of a portion of present invention torque converter 100.

Figure 3:
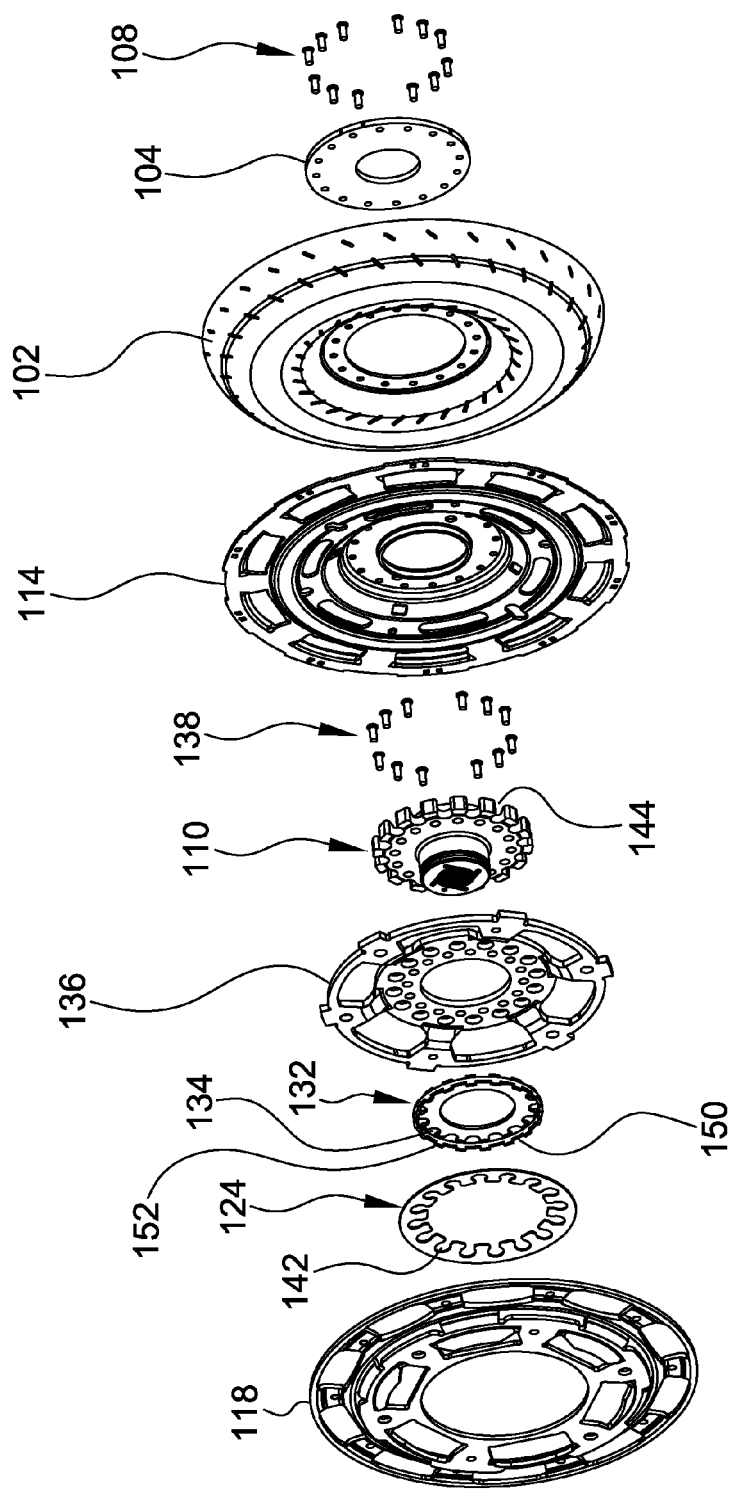
FIG. 3 is an exploded view of a portion of a present invention torque converter.

FIG. 3 is an exploded view of a portion of present invention torque converter 100.

Figure 4:
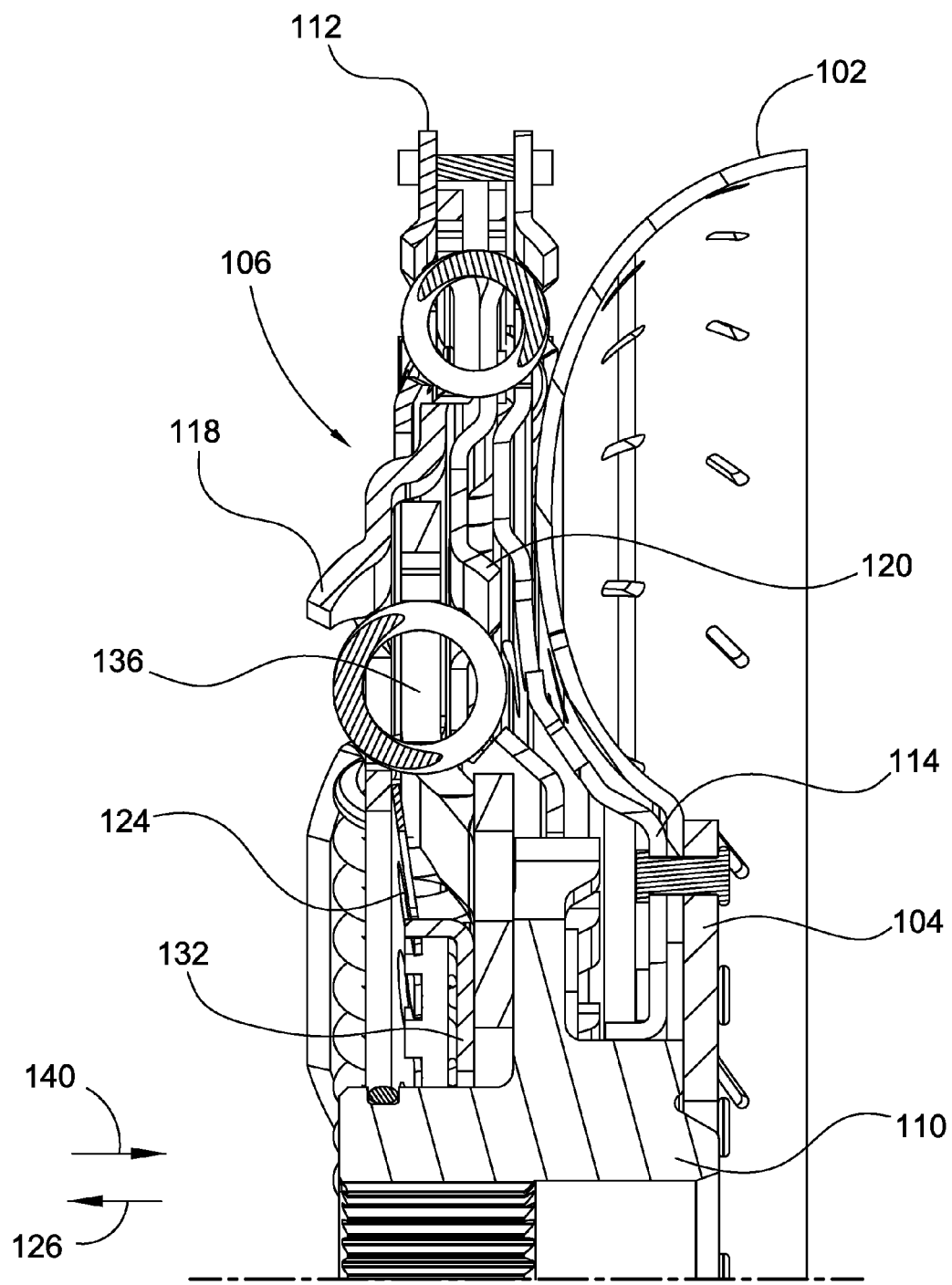
FIG. 4 is a cross-sectional view of a portion of a present invention torque converter.

FIG. 4 is a cross-sectional view of a portion of present invention torque converter 100.

Figure 5:
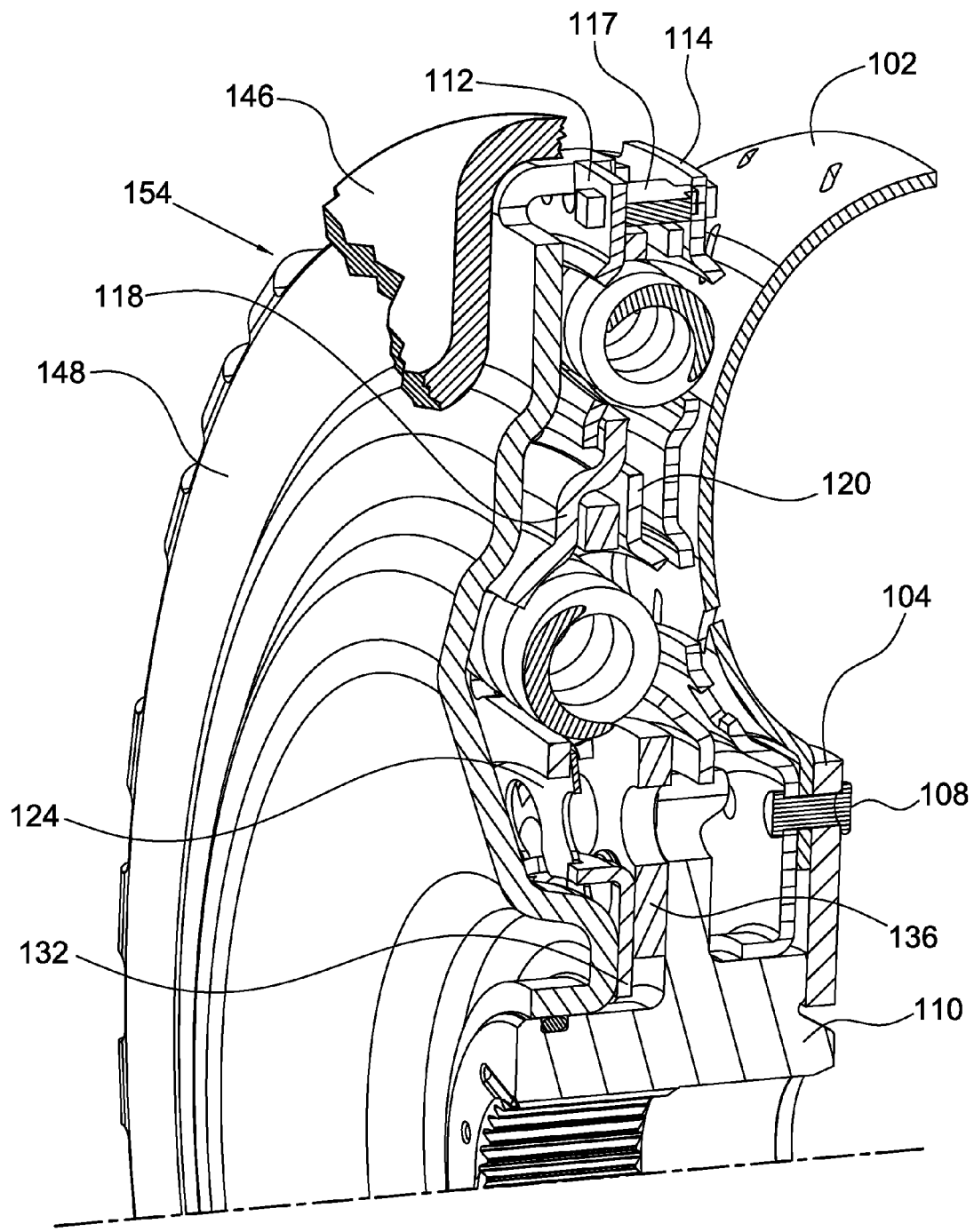
FIG. 5 is a side perspective view of a portion of a present invention torque converter; and, FIG. 6 is a side perspective view of a portion of a present invention torque converter.

FIG. 5 is a side perspective view of a portion of present invention torque converter 100.

Figure 6:
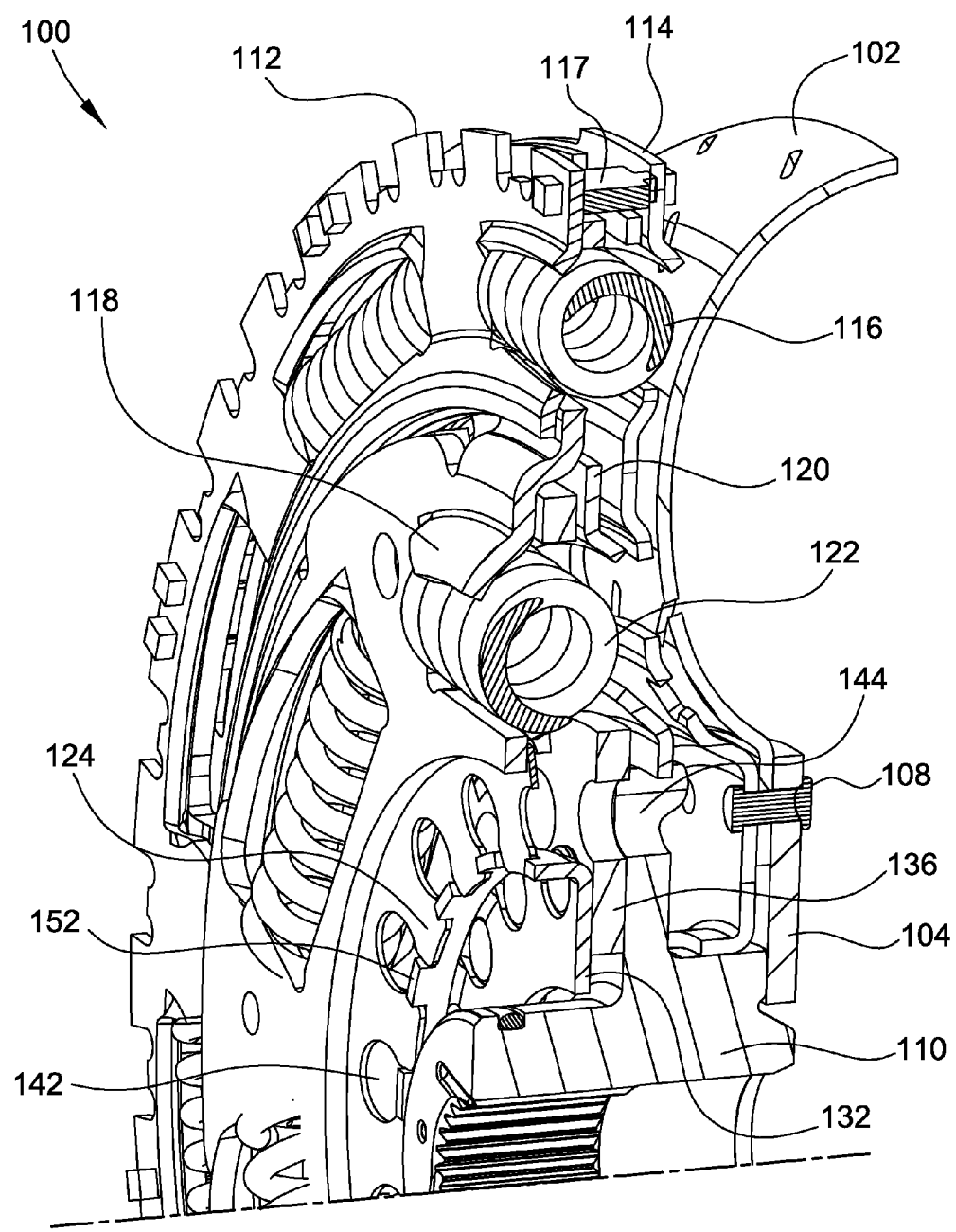

FIG. 6 is a side perspective view of a portion of present invention torque converter 100. The following should be viewed in light of FIGS. 2-6. Torque converter 100 includes turbine shell 102, turbine hub 104 fixedly connected to the turbine shell, and damper assembly 106. The turbine shell and hub are fixed by fasteners 108, which can be any fasteners known in the art. In an example embodiment, the fasteners are rivets. Assembly 106 includes damper hub 110 and cover plates 112 and 114 fixedly connected to one another and engaged with springs 116. Plates 112 and 114 can be fixedly connected by any means known in the art. In an example embodiment, the plates are fixed by rivets 117. Plate 114 is fixedly connected to the turbine hub by any means known in the art, for example, fasteners 108. Assembly 106 also includes cover plates 118 and 120 fixedly connected to one another and engaged with springs 122. Plates 118 and 120 can be fixedly connected by any means known in the art. In an example embodiment, the plates are fixed by rivets. Springs 122 are disposed radially inward of springs 116.

Assembly 106 includes spring 124 for displacing cover plate 118 in axial direction 126 such that cover plates 112 and 118 are in contact and the hubs 104 and 110 are in contact. Spring 124 can be any spring known in the art. In an example embodiment, spring 124 is a diaphragm spring. The preceding contacts are brought about as follows: spring 124 pushes plate 118 in direction 126 so that plate 118 contacts plate 112. Plate 112 is pushed in direction 126 by plate 118 and the connection of plates 112 and 114 displaces plate 114 in direction 126. Since plate 114 is connected to the turbine shell and hub, the hub also is displaced in direction 126 causing hub 104 to contact hub 110. It should be understood that cover plates 112 and 118 and hubs 104 and 110 can rotate in unison (at about the same rotational speed) due to the above referenced contact or can rotate together, but slip with respect to another (one of the plates or hubs rotates faster than the other of the plates or hubs). Alternately stated, cover plates 112 and 118 and hubs 104 and 110 are in frictional engagement and the frictional engagement provides Coulomb dampening.

Assembly 106 includes thrust washer 132 with openings 134, flange 136, and fastening devices 138, which can be any fasteners known in the art. In an example embodiment, the fasteners are rivets. Devices 138 connect the flange to the damper. Spring 124 is for urging the thrust washer against the flange in axial direction 140 such that openings 134 are radially aligned with respective portions of fastening devices 138. Thus, rotation of the flange causes subsequent rotation of fastening devices 138. Since the openings 134 are radially aligned with respective portions of fastening devices 138, when fastening devices 138 rotate, the devices contact the thrust washer and cause the thrust washer to rotate in unison with the flange. Thus, there is little or no slippage between the thrust washer and the flange. This is advantageous, since the flange is made of relatively harder material (to transmit torque and perform other functions of the flange), while it is preferred to make the thrust washer of relatively softer material. If the thrust washer and flange are allowed to slip with respect to each other, the harder flange would undesirably wear the thrust washer.

The torque converter includes cover 146 and axially displaceable piston plate 148 for connecting the damper assembly to the cover plate. That is, when piston plate 148 is displaced to engage the cover, torque is transferred from the cover to the damper assembly through the piston plate. As the piston moves axially towards the cover, the piston axially moves away from the thrust washer. At the same time, the damper hub is prevented from axially displacing in the same direction due to contact between the axial end of the hub and the cover wall. Thus, an axial gap could be created between the piston and the thrust washer. If allowed to develop, the thrust washer would no longer be rotationally fixed due to contact with the flange and the thrust washer would be able to misalign with devices 138. However, advantageously, spring 124 holds the thrust washer against the flange and maintains the radial alignment of openings 134 with the respective portions of the devices 138.

In an example embodiment, spring 124 includes openings 142 axially aligned with fastening devices 108. The openings provide a clear path for the insertion of a tool for use on the fastening devices. In an example embodiment, the devices are rivets and the rivets are inserted through the turbine hub, through the turbine shell, and then through cover plate 114. The remaining components of the damper assembly are stacked and the rivets are coined by punches which extend through the assembled components as follows: through access openings in plate 118, through openings 142, through openings 134 in the thrust washer, through access openings in the flange, through openings 144 in the damper hub, and then through access openings in cover plate 114.

Control step 150 on thrust washer 132 ensures that spring 124 provides a sufficient load throughout the stackup range of the package thickness between cover plate 118 and flange 136. Openings 134 provide a positive rotational stop for the thrust washer against fasteners 138 when piston plate 148 is cycling torsionally while thrusting against the thrust washer (the piston plate is engaged with the cover to transmit torque). Tabs 152 provide a positive rotational stop for spring 124 during torsional cycling of the inner damper assembly (relative motion between cover plate 118 and flange 136).

Assembly 106 transmits torque from an engine (not shown) to a transmission (not shown) as follows: cover 146 transmits torque to piston plate 148 when the piston plate is applied and clamps against the cover. The piston plate transmits torque to cover plate 112 via tooth connection 154. Plate 112 transmits the torque to plate 114 via fasteners 117. Plates 112 and 114 transmit the torque to plates 118 and 120, which are fastened together by any means known in the art, via springs 116. Plates 118 and 120 transmit the torque through springs 122 to flange 136. The flange transmits torque to damper hub 110 via fasteners 138. The damper hub transmits torque to the transmission input shaft spline 156 on the inside diameter of the damper hub.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter, comprising:
  a turbine shell;
  a turbine hub fixedly connected to the turbine shell; and,
  a damper assembly including:
    a damper hub;
    first and second cover plates fixedly connected to one another and engaged with a first plurality of springs, the second plate fixedly connected to the turbine hub;
    third and fourth cover plates fixedly connected to one another and engaged with the plurality of first springs and with a second plurality of springs disposed radially inward of the first plurality of springs; and,
    a third spring for displacing the third cover plate in a first axial direction such that the first and third cover plates are in contact and the turbine and damper hubs are in contact.

2. The torque converter of claim 1, wherein the third spring is for displacing the second plate in the first axial direction such that the turbine hub is displaced in the first axial direction.

3. The torque converter of claim 2, wherein the third spring is for displacing the second plate in the first axial direction via the connection of the first and second cover plates.

4. The torque converter of claim 1, further comprising a plurality of fastening devices wherein:
  the damper assembly includes:
    a flange connected to the damper hub with the plurality of fastening devices; and,
    a thrust washer with a plurality of openings, wherein the third spring is for urging the thrust washer against the flange in a second axial direction, opposite the first axial direction, such that the plurality of openings is radially aligned with respective portions of the plurality of fastening devices.

5. The torque converter of claim 4, wherein the radial alignment of the plurality of openings with respective portions of the plurality of fastening devices is for rotating the flange and the thrust washer in unison.

6. The torque converter of claim 1, further comprising a plurality of fastening devices fixedly connecting the turbine shell, the turbine hub, and the second cover plate to one another, wherein the third spring includes a plurality of openings axially aligned with the plurality of fastening devices.

7. A torque converter, comprising:
  a turbine shell;
  a turbine hub; and,
  a damper assembly including:
    a damper hub;
    first and second cover plates fixedly connected to one another and engaged with a first plurality of springs;
    third and fourth cover plates fixedly connected to one another and engaged with the first plurality of springs and with a second plurality of springs disposed radially inward of the first plurality of springs;
    a flange engaged with the second plurality of springs;
    a thrust washer with a plurality of openings;
    a first plurality of fastening devices connecting the damper hub and the flange; and,
    a third spring for urging the thrust washer against the flange in a first axial direction such that the first plurality of openings is radially aligned with respective portions of the plurality of fastening devices.

8. The torque converter of claim 7, wherein the radial alignment of the first plurality of openings with respective portions of the plurality of fastening devices is for rotating the flange and the thrust washer in unison.

9. The torque converter of claim 7, wherein the thrust washer is connected to the third spring such that the thrust washer and the third spring are rotatable in unison and the thrust washer is axially displaceable with respect to the third spring.

10. The torque converter of claim 7 further comprising:
  a cover; and,
  an axially displaceable piston plate for connecting the damper assembly to the cover, wherein when the piston plate is not connecting the damper assembly to the cover, the third spring is for maintaining the radial alignment of the plurality of openings with the respective portions of the plurality of fastening devices.

11. The torque converter of claim 7, wherein the third spring is for displacing the third cover plate in a second axial direction, opposite the first axial direction, such that the first and third cover plates are in contact and the turbine and damper hubs are in contact.

12. The torque converter of claim 11, wherein the third spring is for displacing the second plate in the second axial direction such that the turbine hub is displaced in the second axial direction.

13. The torque converter of claim 7, further comprising a second plurality of fastening devices fixedly connecting the turbine shell, the turbine hub, and the second cover plate to one another, wherein the third spring includes a plurality of openings axially aligned with the second plurality of fastening devices.

14. A torque converter, comprising:
  a turbine shell;
  a turbine hub;
  a first plurality of fastening devices fixedly connecting the turbine shell to the turbine hub; and,
  a damper assembly including:
    a damper hub;
    first and second cover plates fixedly connected to one another and engaged with a first plurality of springs, the second plate fixedly connected to the turbine hub by the first plurality of fastening devices;

third and fourth cover plates fixedly connected to one another and engaged with the first plurality of springs and with a second plurality of springs disposed radially inward of the first plurality of springs; and, a third spring with a first plurality of openings, wherein the first plurality of openings is axially aligned with the first plurality of fastening devices.

15. The torque converter of claim 14, wherein the third spring is for displacing the third cover plate in a second axial direction, opposite the first axial direction, such that the first and third cover plates are in contact and the turbine and damper hubs are in contact.

16. The torque converter of claim 15, wherein the third spring is for displacing the second plate in the second axial direction such that the turbine hub is displaced in the second axial direction.

17. The torque converter of claim 16, wherein the third spring is for displacing the second plate in the second axial direction via the connection of the first and second cover plates.

18. The torque converter of claim 14, wherein:
the damper assembly includes:
a flange engaged with the second plurality of springs;
a thrust washer including a second plurality of openings; and,
a second plurality of fastening devices connecting the damper hub to the flange; and,
the third spring is for urging the thrust washer against the flange in the first axial direction such that the second plurality of openings is radially aligned with respective portions of the second plurality of fastening devices.

19. The torque converter of claim 18, wherein the radial alignment of the second plurality of openings with respective portions of the second plurality of fastening devices is for rotating the flange and the thrust washer in unison.

20. A method for assembling a torque converter, comprising:
stacking a turbine hub, a turbine shell, and a first plate for a damper assembly;
inserting a plurality of rivets through respective openings in the turbine hub, the turbine shell, and the first plate;
stacking remaining parts for the damper assembly including: second, third, and fourth plates; a flange; a thrust washer; and a diaphragm spring, such that the diaphragm spring urges the thrust washer against the flange;
inserting a tool respective openings in the first and second cover plates, the diaphragm spring, the thrust washer, and the flange to access the plurality of rivets; and,
coining the plurality of rivets using the tool.

* * * * *